US009168596B2

(12) United States Patent
Jonsson (10) Patent No.: US 9,168,596 B2
(45) Date of Patent: Oct. 27, 2015

(54) BLADE GUARD FOR A SAW (75) Inventor: Andreas Jonsson, Asbro (SE)

(73) Assignee: HUSQVARNA AB, Huskvarna (SE)

( * ) Notice: Subject to any disclaimer, the term of this patent is extended or adjusted under 35 U.S.C. 154(b) by 171 days.

(21) Appl. No.: 13/819,974

(22) PCT Filed: Sep. 1, 2011

(86) PCT No.: PCT/SE2011/051049
§ 371 (c)(1),
(2), (4) Date: Feb. 28, 2013

(87) PCT Pub. No.: WO2012/030290
PCT Pub. Date: Mar. 8, 2012

(65) Prior Publication Data
US 2013/0174707 A1 Jul. 11, 2013

Related U.S. Application Data (60) Provisional application No. 61/379,048, filed on Sep. 1, 2010.

(51) Int. Cl.
B23D 47/02 (2006.01)
B23D 47/00 (2006.01)
B27G 19/02 (2006.01)
B28D 1/04 (2006.01)
B28D 7/00 (2006.01)

(52) U.S. Cl.
CPC ............... *B23D 47/00* (2013.01); *B27G 19/02* (2013.01); *B28D 1/044* (2013.01); *B28D 1/045* (2013.01); *B28D 7/00* (2013.01); *Y10T 83/7734* (2015.04)

(58) Field of Classification Search
CPC ........ B27G 19/02; B23D 47/00; B26D 1/045; B28D 1/044; B28D 7/00; B27B 27/02; B27B 5/07
USPC ............. 83/478, 469, 613, 471.3, 467.1, 614, 83/468.4, 486.1, 581, 486.3; 403/83
See application file for complete search history.

(56) References Cited

U.S. PATENT DOCUMENTS 2,705,979 A * 4/1955 Starr ........................... 83/477.1
4,693,156 A * 9/1987 Olvera ........................... 83/422

(Continued)

FOREIGN PATENT DOCUMENTS

WO 9508422 A1 3/1995
WO 2009108094 A1 9/2009
WO 2012030290 A1 3/2012

OTHER PUBLICATIONS

International Search Report for International Application No. PCT/SE2011/051049, dated Nov. 25, 2011; 5 pages.

(Continued)

Primary Examiner — Ghassem Alie
(74) Attorney, Agent, or Firm — Nelson Mullins Riley & Scarborough LLP (57) ABSTRACT A blade guard for a circular saw blade. The blade guard includes at least two pieces coupled together. The blade guard also includes at least one bottom plate having a slot formed therein for accommodating the circular saw blade and at least one top cover. Additionally, the blade guard includes a plurality of fastening rods for coupling the bottom plate with the top cover, the plurality of fastening rods further configured to secure the at least two pieces to the at least one bottom plate and the at least one top cover.

14 Claims, 7 Drawing Sheets

(56) References Cited

U.S. PATENT DOCUMENTS

| | | | |
|---|---|---|---|
| 4,802,399 A * | 2/1989 | Olson | 83/425 |
| 4,840,097 A * | 6/1989 | Campbell | 83/829 |
| 5,205,197 A * | 4/1993 | Wiltshire | 83/364 |
| 5,303,626 A * | 4/1994 | Uehara et al. | 83/485 |
| 5,429,109 A | 7/1995 | Chiuminatta et al. | |
| 5,868,054 A * | 2/1999 | Chubb et al. | 83/522.18 |
| 7,219,434 B2 | 5/2007 | Moore et al. | |
| 7,555,976 B2 * | 7/2009 | Logan et al. | 83/471 |

OTHER PUBLICATIONS

Written Opinion of the International Searching Authority for International Application No. PCT/SE2011/051049, dated Nov. 25, 2011; 6 pages.

\* cited by examiner

BLADE GUARD FOR A SAW

CROSS-REFERENCE TO RELATED APPLICATIONS

This application is a national stage entry of PCT/SE2011/051049, which was filed on Sep. 1, 2011, which claims priority to U.S. Provisional Application No. 61/379,048, filed on Sep. 1, 2010, said application is expressly incorporated herein in its entirety.

FIELD

This disclosure is directed towards a blade guard for a circular saw.

BACKGROUND

Moveable machining equipment is typically large and difficult to maneuver pieces of equipment. Wall saws are an example of movable machining equipment. Wall saws can typically include with a disc-shaped blade, which is securable on a to-be-cut wall and is designed for cutting stone and the like. For example, wall saws can be used in a construction industry to cut out an opening in a wall in several offset steps by separating appropriate wall pieces. The to-be-cut wall can be a wall of a room, a ceiling, or the floor. In some implementations, the wall saw can be incorporated into a transport mechanism that drives the wall saw across the to-be-cut wall, so that the transport mechanism and the wall saw mechanisms are effectively integrated into a single unit. In some implementations, the wall saw can be a separate mechanism from the transport mechanism. For example, wall saws can be coupled to a track to provide a controlled movement of the wall saw to cut through the to-be-cut wall.

BRIEF DESCRIPTION OF FIGURES

Exemplary methods and arrangements conducted and configured according to the advantageous solutions presented herein are depicted in the accompanying drawings wherein.

DETAILED DESCRIPTION

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

The present disclosure is directed towards a blade guard. While the blade guard is described herein in relation to a wall saw, the blade guard can be directed to other saws having a rotating circular cutting blade. The blade guard provides a barrier between the operator and rotating circular saw blade. The blade guard can limit the impact of debris within a particular environment. In at least one embodiment, the blade guard is implemented with a wet saw wherein water or other liquid is supplied to the cutting surface. The blade guard restricts the direction in which the cutting fluid is expelled from the cutting blade.

Figure 1:
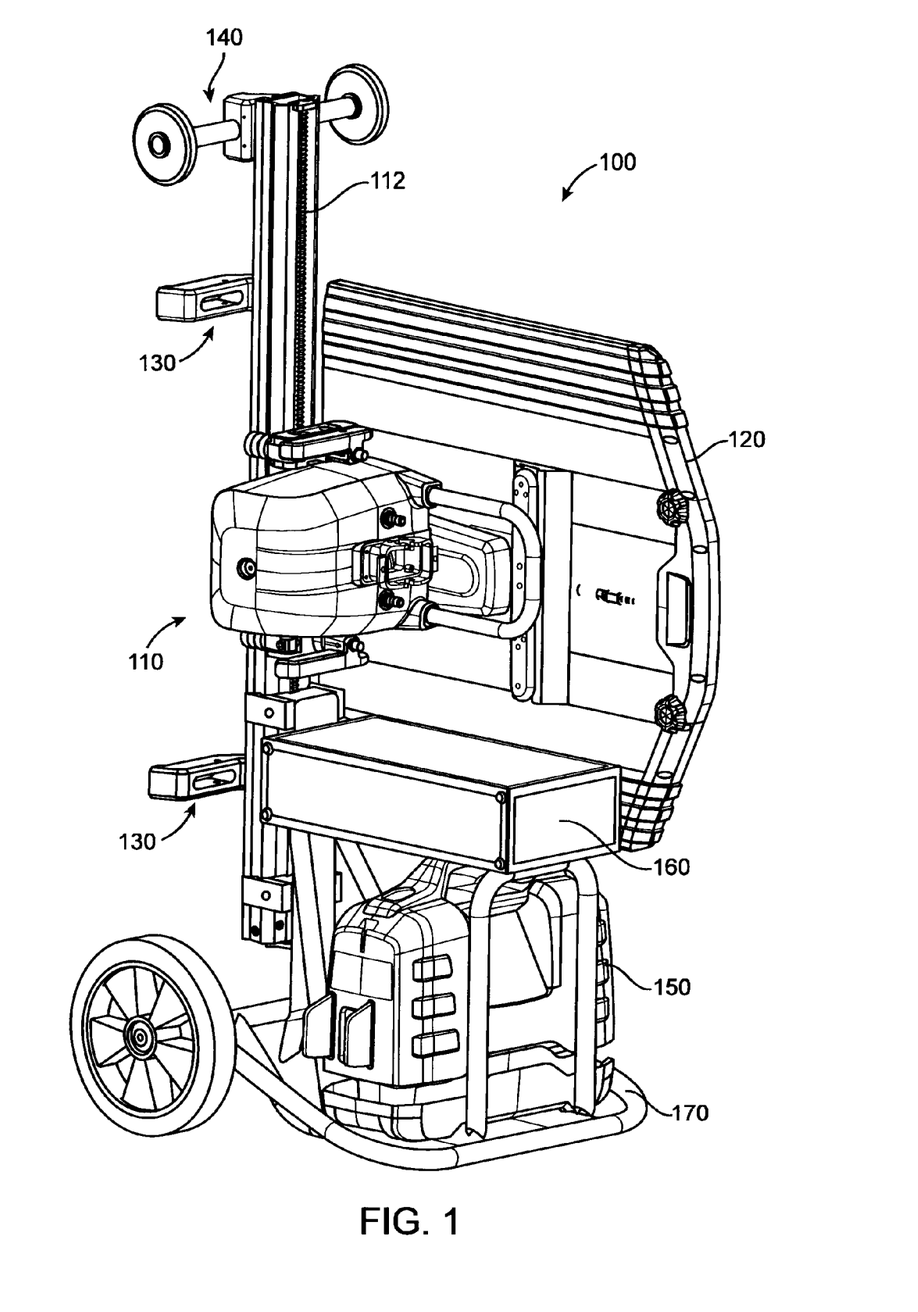
FIG. 1 is an exemplary wall saw having the mounting brackets of the present disclosure.

As mentioned above, the blade guard can be configured for use with a wall saw. An example of a wall saw including the blade guard as described herein is illustrated in FIG. 1. The wall saw 100 can include one or more of the components as illustrated and described herein. The wall saw 100 includes a saw unit 110. The saw unit 110 includes a drive motor and other driveline components such as gears, saw head coupling mechanisms and the like. As illustrated a handle is provided on the saw unit 110. The handle allows the saw unit 110 to be manipulated by the operator in placing the saw on the track 112. Additionally, the handle can be used by the operator to transport the saw unit 110 when it is separate from the wall saw 100 as illustrated.

The track 112 on which the saw unit 110 is mounted also has track mounting brackets 130 attached to the rear thereof. The track mounting brackets 130 enable an operator to position the wall saw 100 against a wall and fasten the track mounting brackets 130 to the wall. The securement of the track mounting brackets 130 to the wall in turn secures the wall saw 100 through the coupling of the track mounting brackets 130 to the track 112 which in turn the saw unit 110 is coupled thereto. The securement of the track mounting brackets 130 to the wall in turn secures the wall saw 100 with the track 112 to the wall. A special trolley has a wheeled frame 170 to which the wall saw with track is secured as one unit, so it can be easily transported and even be positioned against a wall or floor and fastened to it by securement of at least one track mounting bracket and thereafter be released from the wheeled frame 170. The track 112 infact forms an important substantially vertical part of the trolley, so the trolley does not need a separate vertical structure, which saves weight and facilitates securement of the wall saw to a wall or floor. Thereby it forms a smart handling system for the saw.

The wall saw 100 also includes a blade guard 120. The blade guard 120 can be changed out depending on the size of the cutting blade. For example, a given wall saw 100 can be configured for use with four or five different blade diameters. In at least one embodiment, the blade guard 120 is sized in dependence upon the selection of a particular blade diameter. The blade guard can be releasably attached to the saw unit 110 such that a portion of the saw blade is concealed within the blade guard 120.

In order for the saw unit 110 to operate, the wall saw 100 can include a power pack 150 and remote control unit 160. The power pack 150 can be specifically designed to accommodate electrical or hydraulic saw units 110. For example, the power pack 150 can be a hydraulic power pack whereby electric power is turned into hydraulic power by the power pack. The remote control unit 160 can be configured to be operated by an operator at a distance away from the wall saw 100. This distance may be necessary depending on the environment in which the wall saw 100 is operated. Additionally, the illustrated embodiment includes a saw frame 170 for transporting the wall saw 100. As shown the saw frame includes wheels and a frame in which the power pack 150 is mounted. The remote control unit 160 can also be mounted thereon. The track 112 can be affixed to the frame via a frame track coupling mechanism. Additionally, a track handle 140 is provided. The track handle 140 can be configured to be removably coupled to the track 112. The track handle 140 can be placed on the track 112 at a desired distance. Additionally, the track handle 140 as illustrated includes wheels which allow for the wall saw 100 to be positioned such that the track 112 is parallel to the ground or other horizontal surface rather than the vertical orientation as illustrated.

The blade guard 120 as presented herein is configured to allow for the use of standardized components to construct blade guards 120 of varying size. Additionally, the blade guard 120 as presented herein in at least one embodiment can be partially disassembled by an operator so as to expose a portion of the circular cutting blade. The use of standardized components allows for the varying sizes of blade guards to be constructed without over producing a particular size of blade guard. The examples of the blade guards as presented herein are provided as examples only and other blade guards constructed as described herein are within the scope of this disclosure.

In order to illustrate the components associated with the blade guard, the following figures present various views of the blade guard and in some instances would not be representative of a stage in the assembly of the blade guard but are presented in order to illustrate the components and relative position of the components.

Figure 2:
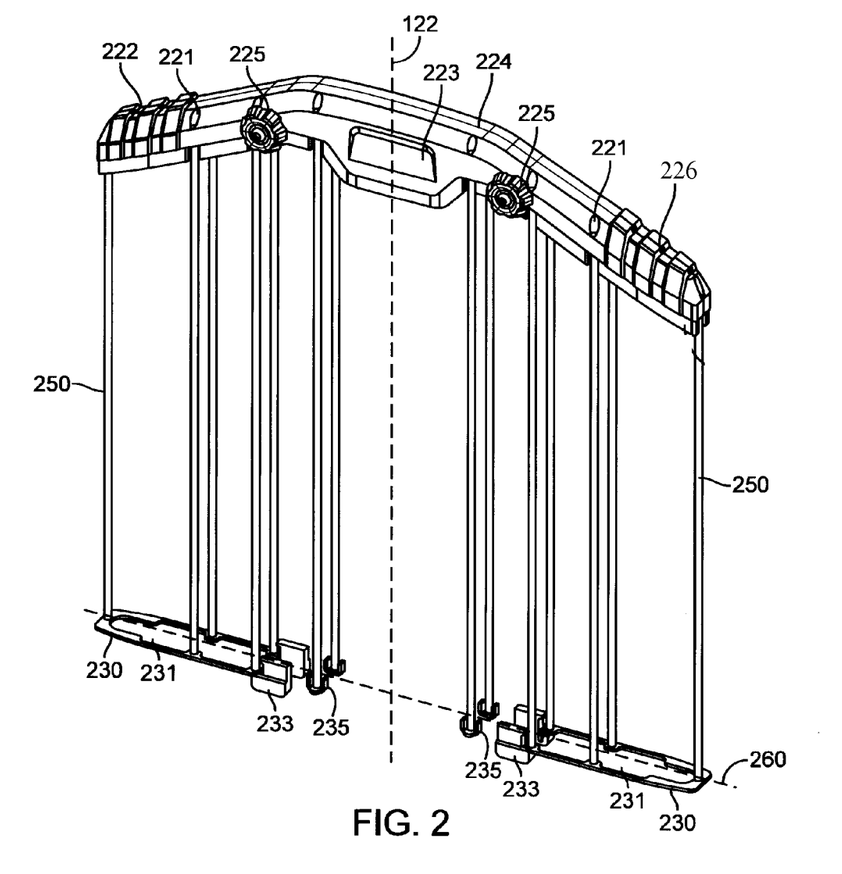
FIG. 2 is a perspective view of an exemplary blade guard wherein the plurality of fastening rods are shown.

As illustrated in FIG. 2, the blade guard 120 includes a top cover 220, bottom plate 230 and fastening rods 250. As shown, the fastening rods couple the bottom plate 230 with the top cover 220. The plurality of fastening rods are configured to secure the at least one side cover 240 (shown in FIG. 4).

The top cover 220 can comprise a plurality of top covers. While the illustrated example includes three top covers 220, the top cover 220 can be a single top cover, two top covers, or multiple top covers. In the illustrated example, the top cover 220 includes a left top cover 222, a middle top cover 224, and right top cover 226. The left top cover 222 and right top cover 226 can be substantially identical top covers just rotated to fit with the middle top cover 224. As illustrated the right top cover 226 is a symmetric with respect to the blade guard centerline 122. The blade guard centerline 122 is the vertical centerline of longest side for the blade guard 120.

The left top cover 222 and the right top cover 226 can be releasably coupled to the middle top cover 224 by fasteners 225. The fasteners 225 have a gripable circumference to enable an operator to remove the fasteners 225 by hand without the need for additional tools. These fasteners 225 allow for the separation of the left top cover 222 and right top cover 226 from the middle top cover. The removal of the left top cover and right top cover can be desirable in certain circumstances.

The at least one bottom plate 230 is configured with a slot 231 formed therein for accommodating a circular saw blade (not shown). The at least one bottom plate 230 is the portion of the blade guard 120 that is configured to be nearest the surface being cut by the circular saw. In at least one embodiment, the at least one bottom plate 230 is not configured to contact the surface being cut by the circular saw.

In the illustrated example of FIG. 2, two bottom plates 230 are included. There is a left hand bottom plate 230 to the left of center line 122 and a right hand bottom plate 230 to the right of centerline 122. The right hand bottom plate 230 and left hand bottom plate 230 can be substantially identical bottom plates just rotated with respect to the other. The fastening rods 250 can be releasably coupled to the bottom plate or permanently fastened to the bottom plate. In at least one embodiment, the bottom plate 230 is affixed to the fastening rod 250 using a rivet. The coupling of the fastening rod 250 to the bottom plate 230 can be done once the side plates (as described below) are positioned between the top cover 220 and bottom plate 230.

Figure 3:
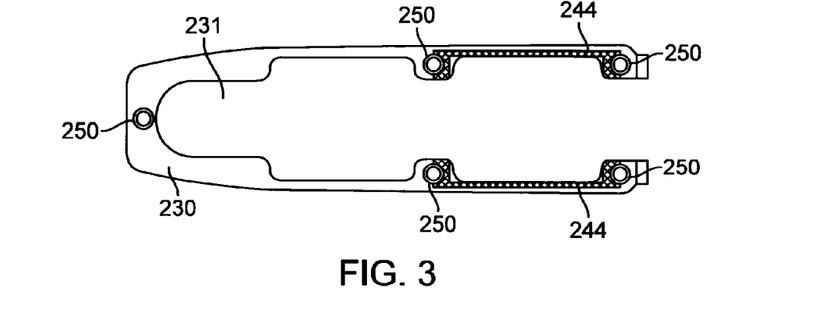
FIG. 3 is a cross-section view of a portion of the blade guard of FIG. 4 illustrating the bottom plate, fastening rods, and two substantially symmetrical pieces.

An example cross-section view of the bottom plate 230, Fastening rods 250, and piece 244 of a side cover are shown in FIG. 3. As illustrated the two pieces 244 are each positioned between a pair of fastening rods 250. Once the pieces 244 are positioned along with other side pieces, the fastening rods 250 can be coupled to both the top cover 220 and bottom plate 230. In some embodiments, such as the ones illustrated in FIGS. 2 and 4, the bottom plate does not run the entire length of the blade guard 120. When the bottom plate is not present other connectors can be implemented such as those described in relation to FIG. 10 below.

Figure 4:
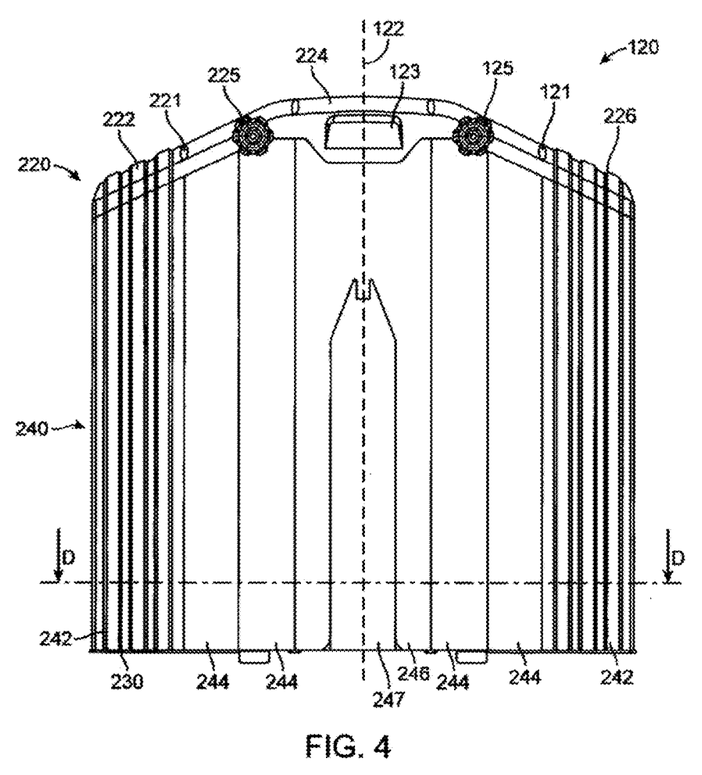
FIG. 4 is an elevational view of an exemplary blade guard in accordance with the present disclosure.

Once all the pieces of the side cover 240 are positioned between the bottom plate 230 and the top cover 220 and the fastening rods coupling the bottom plate 230 with the top cover 220, the blade guard 120 can resemble the blade guard illustrated in FIG. 4. The fastening rods 250 are further configured to secure the pieces of the of the side cover in spatial relationship with respect to the top cover 220 and bottom plate 230.

As illustrated the side cover 240 comprises four different profile pieces. The four different profile pieces include an end piece 242, a narrow piece 244, a back side piece 247 and an arbor side piece 246. As illustrated the blade guard 120 includes four end pieces 242, eight narrow pieces 244, one back side piece 247 and one arbor side piece 246. The back side piece 247 and arbor side piece 246 have substantially the same width.

Figure 5:
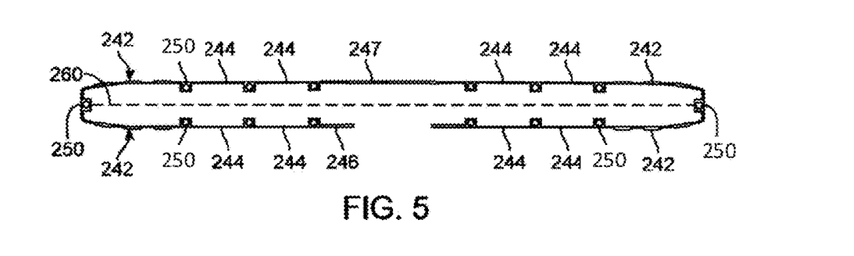
FIG. 5 is a cross-sectional view D-D of FIG. 4.

Additionally, these pieces are shown in the section view of FIG. 5 taken along section line D-D of FIG. 4. The plurality of pieces can include at least two substantially symmetrical pieces 242. As seen in FIG. 5, the at least two substantially symmetrical pieces 242 are symmetric with respect about centerline 260 of the circular saw blade (not shown). The section profiles of the end pieces 242, narrow pieces 244, and arbor side piece 246 are shown. Additionally, a back side piece 247 is illustrated in FIG. 5. With the exception of the arbor side piece 246 and back side piece 247, the pieces are symmetric with respect to the centerline 260. For example, on the right left side of the illustration, there are two end pieces 242 that are symmetric about centerline 260. Additionally on the left side of arbor side piece 246 and back piece 247, there are four narrow pieces 244, which have two pairs of substantially symmetric pieces. On the right side of the arbor side piece 246 and back piece 247, there are four narrow pieces 244, which have two pairs of substantially symmetric pieces. Additionally on the right side of the arbor side piece 246 and back piece 247, there are two end pieces 242 that are symmetric about centerline 260.

The arbor side piece 246 and back side piece 247 are not complete symmetrical with respect to centerline 260 because the arbor side piece has a arbor accommodating slot formed therein for receiving the arbor and axle of the circular saw.

Also, illustrated in the cross-sectional view of FIG. 5 are the fastening rods 250. The fastening rods 250 as shown in cross-section have a circular cross-section. In other embodiments, the cross-section of the fastening rods 250 can have other shapes such as triangles, ovals, polygons, and the like. Additionally, the cross-section of the fastening rods 250 can change along the length of the fastening rods 250.

Figure 6:
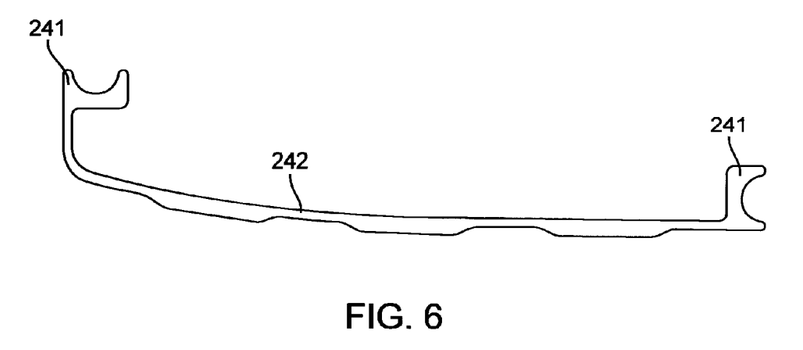
FIG. 6 is a first profile of an exemplary piece.
Figure 7:
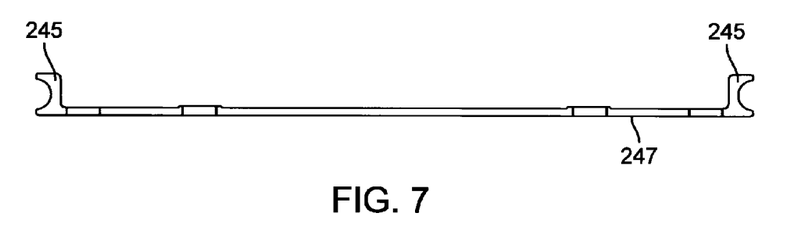
FIG. 7 is a second profile of another exemplary piece.
Figure 8:
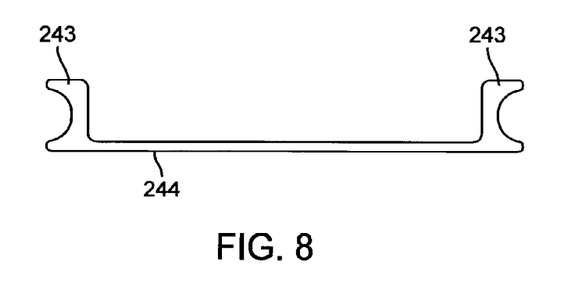
FIG. 8 is a third profile of yet another exemplary piece.

Cross-sectional profiles of the end pieces 242, back side piece 247, and narrow pieces 244 are further illustrated with respect to FIGS. 6-8. The end piece 242 cross-sectional profile is illustrated in FIG. 6. As illustrated in FIG. 6, the cross-sectional profile illustrates two ends 241 that are c-shaped. The c-shaped ends 241 are configured to be secured by the fastening rods 250 as illustrated in FIG. 5.

Likewise, the back side piece 247 cross-sectional profile is illustrated in FIG. 7. As illustrated in FIG. 7, the cross-sectional profile illustrates two ends 245 that are c-shaped. The c-shaped ends 245 are configured to be secured by the fastening rods 250 as illustrated in FIG. 5.

Similarly, the narrow piece 244 cross-sectional profile is illustrated in FIG. 8. As illustrated in FIG. 8, the cross-sectional profile illustrates two ends 243 that are c-shaped. The c-shaped ends 243 are configured to be secured by the fastening rods 250 as illustrated in FIG. 5.

Figure 9:
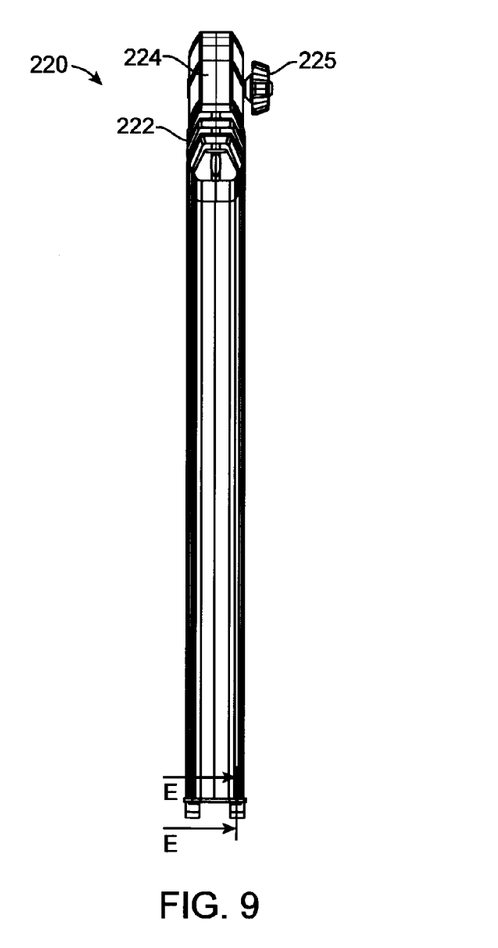
FIG. 9 is an elevational end view of the blade guard of FIG. 4.

FIG. 9 is an elevational end view of an exemplary blade guard 120. As illustrated, the top cover 220 is illustrated. The top cover fastener 225 is also illustrated. As seen in the illustration the top cover fastener 225 has a knob that is located on one side of the blade guard 120. In other embodiments, the top cover fastener 225 can have knobs on both sides of the blade guard 120. Additionally, in at least one embodiment, the side of blade guard on which the know of the top cover fastener 225 can be reversed such that as illustrated it is on the right side of the blade guard in the illustration, it can instead be mounted on the left side of the blade guard 120.

The top cover fastener 225 allows for at least a portion of the blade guard 120 to be removed from the other portion of the blade guard 120. The top cover fastener as described above holds the middle top cover 224 together with the left top cover 222. When the fastener is removed the left top cover 222 can be separated from the remainder of the top cover 220 including the middle top cover 224 and right top cover 226.

Figure 10:
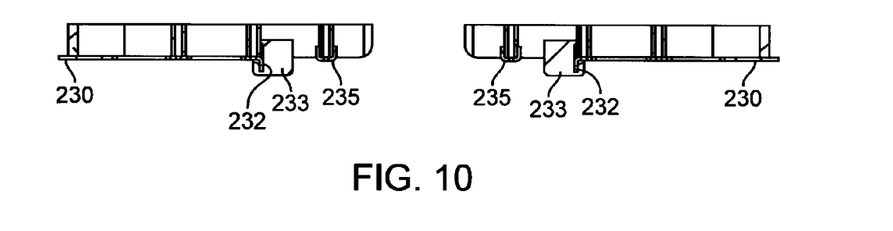
FIG. 10 is a cross-sectional view E-E of FIG. 9.

As illustrated in FIG. 10 (the cross-section E-E of FIG. 9), the bottom plate 230 can be coupled together with and adjacent side cover component 240. As illustrated the bottom plate 230 includes a downward hook 232. The downward hook can be coupled to the adjacent side cover component using the connecting block 233. The connecting block 233 allows the bottom plate plate 230 to be removably coupled to the adjacent side cover component. In order to allow the bottom plate 230 to be separated from the adjacent bottom components the connecting block 233 can be removed. If both the connecting block 233 and the top cover fastener 225 coupling a portion of the blade guard 120 are removed, that portion of the blade guard 120 can be removed from the remainder of the blade guard 120. With the portion of the blade guard removed, the saw can more easily cut certain features such as portion of a wall adjacent the ceiling and the like.

Figure 11:
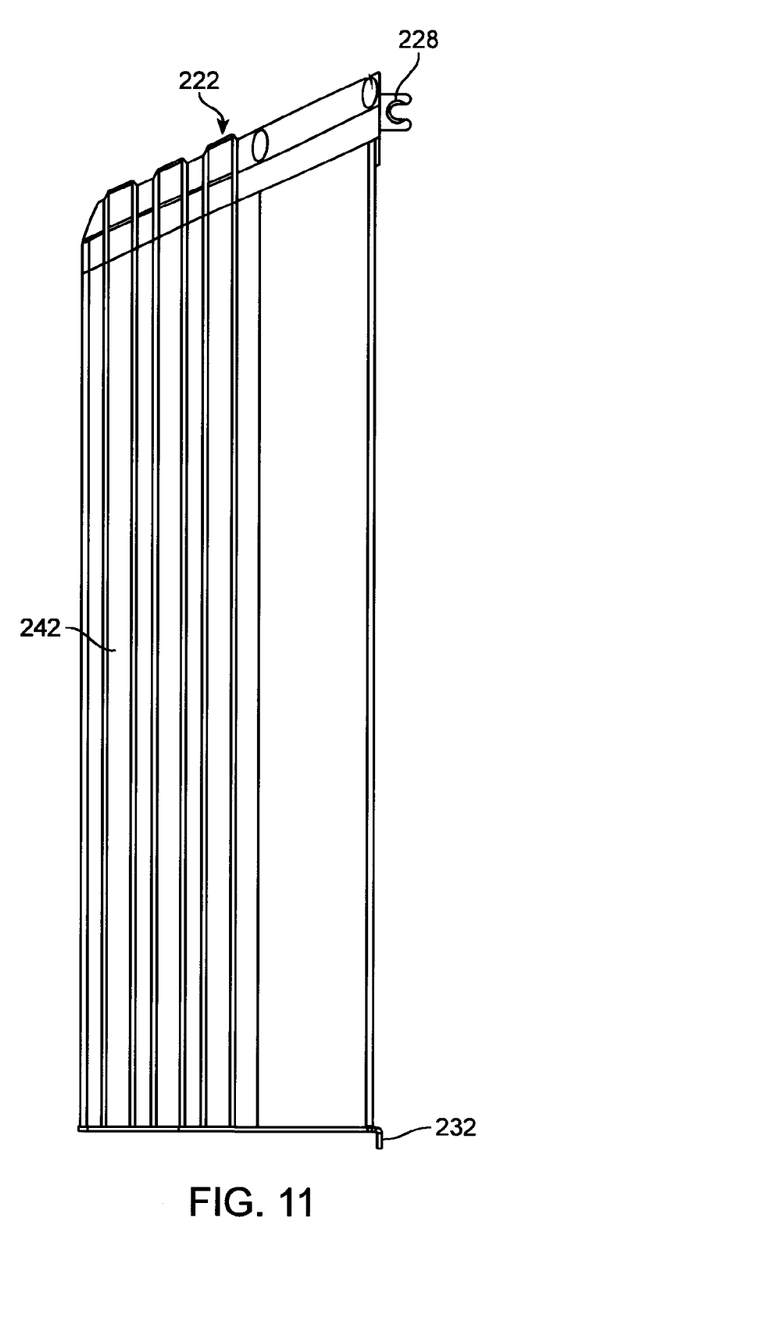
FIG. 11 is an elevational view of a portion of the blade guard of FIG. 4.

For example, a portion of the blade guard 120 that has been separated from the remainder of the blade guard 120 is illustrated in FIG. 11. As illustrated the portion of the blade guard has a connector 228 for connecting with the top cover fastener 225. In at least one embodiment, the top cover fastener 225 and the connector 228 are threaded for threaded engagement with one another. In another embodiment, the top cover fastener 225 is configured for threaded engagement with an opposite side of the top cover 220 of which it traverses. In this configuration, the connector 228 is not threaded and is configured for releasable engagement when the top cover fastener 220 is removed.

Figure 12:
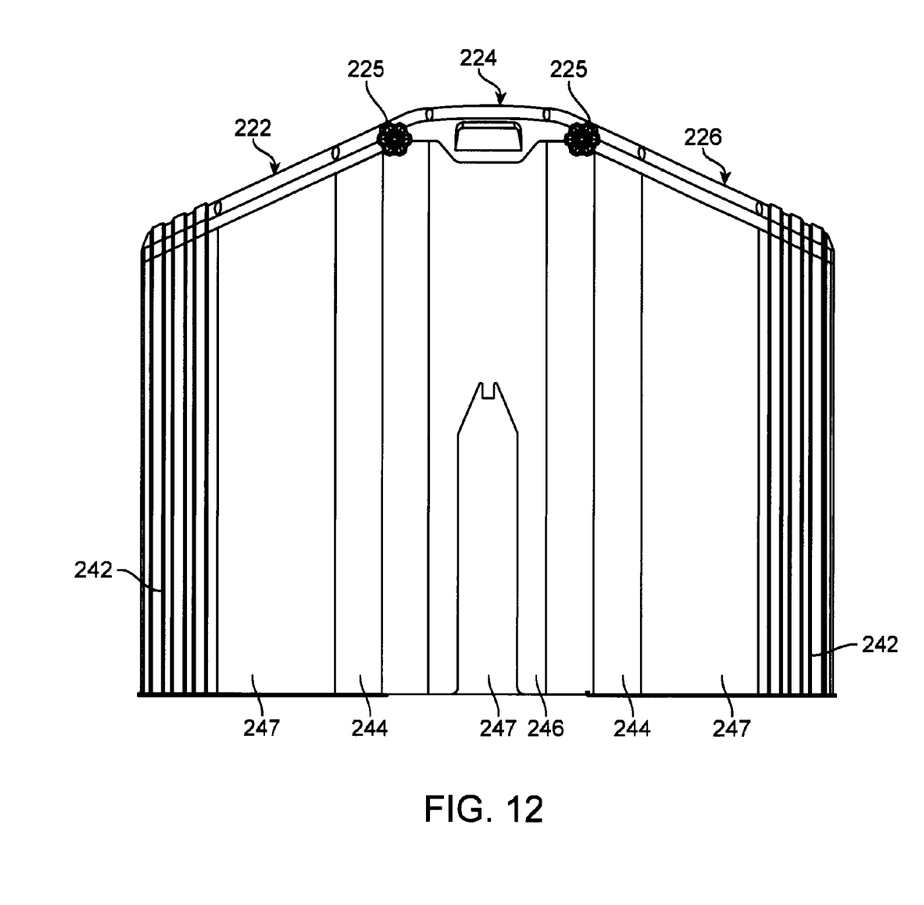
FIG. 12 is another exemplary blade guard according to the present disclosure.

FIG. 12 illustrates another exemplary blade guard 120 according to the present disclosure. As mentioned above, the blade guard 120 can be configured to accommodate a variety of sizes of blades. In one specific, but not limiting embodiment, the end piece 242 profile can have a width of 108 mm, the narrow piece profile can have a width of 66.7 mm, and the back side piece profile can have a width of 166.66 mm. The blade guard of FIG. 12 has two end pieces 242, three back pieces 247, and two narrow pieces on each side. Thus, the blade guard 120 as illustrated in FIG. 12 has a width of 849.38 mm. The blade guard of FIG. 4 has two end pieces 242, one back piece 247, and four narrow pieces on each side. In the configuration as illustrated in FIG. 4, the blade guard has a width of 649.46 mm. As illustrated by these two different blade guard configurations, the same profiles can be implemented to produce blade guards having different widths.

In at least one embodiment, the top cover 220 of the blade guards of FIGS. 4 and 12 are different from one another. In the illustrated embodiments, the top cover 220 in each comprise three different covers. Thus, the thre different covers are sized different in FIGS. 4 and 12. In other embodiments, the top covers can be made up of uniformly sized components similar to that of the side profiles as described above.

The bottom plate plate 330 can be made of different sizes for different blade guard configurations such as those illustrated in FIGS. 4 and 12. In other embodiments, the bottom plate plate 330 can be sized uniformly.

Additionally, the blade guard 120 can also be configured to accommodate a flush cut. In a flush cut situation one side of the circular saw blade is flush with another surface. For example, when the wall saw as described herein is used to cut a doorway into a wall, three of the cuts (each side and top) can be cut with the blade guard 120 as described herein in place. When the bottom cut is made, the portion of the blade guard on the side of the saw blade can be removed as well. In at least one embodiment, the portion of the blade guard that is removed can be about half or a little less than half of the blade guard 120. The portion of the blade guard that is removed exposes portion of the blade nearest the adjacent surface. The adjacent surface effective serves as a blade guard.

The above examples of blade configurations with specific widths of the blade guard and components are merely exemplary and the present disclosure is not limited thereto. In other embodiments, the width of the components can be varied and produce a variety of different blade guard sizes. As described herein, the blade guard can be constructed to be composed of a limited number of different side profiles so as to allow for interchangeability of components during fabrication of a variety of different sizes of blade guards.

What is claimed is:

1. A blade guard for a circular saw blade of a saw comprising:
    at least two pieces coupled together;
    at least one bottom plate having a slot formed therein for accommodating the circular saw blade;
    at least one top cover attachable to the saw, wherein the top cover comprises three or more components;
    a plurality of fastening rods for coupling the bottom plate with the top cover, the plurality of fastening rods further configured to secure the at least two pieces to the at least one bottom plate and the at least one top cover.

2. The blade guard as recited in claim 1, further comprising releasable top cover fasteners to couple the two or more components of the top cover.

3. The blade guard as recited in claim 2, wherein the releasable top cover fasteners enable a partial disassembly of the blade guard whereby one of the two or more components of the top cover and accompanying bottom plate, pieces, and the fastening rods can be removed.

4. A blade guard for a circular saw blade of a saw comprising:
- at least two pieces coupled together, wherein the at least two pieces have corresponding substantially symmetrical pieces across the centerline of the circular saw blade;
- at least one bottom plate having a slot formed therein for accommodating the circular saw blade;
- at least one top cover attachable to the saw; and
- a plurality of fastening rods for coupling the bottom plate with the top cover, the plurality of fastening rods further configured to secure the at least two pieces to the at least one bottom plate and the at least one top cover.

5. The blade guard as recited in claim 4, wherein each piece forming a c-shaped distal end with each configured to receive one of the plurality of fastening rods.

6. The blade guard as recited in claim 4, wherein the at least two pieces cover a portion of the circular saw blade.

7. The blade guard as recited in claim 6, wherein the at least two pieces cover one side of the circular saw blade.

8. The blade guard as recited in claim 6, wherein the at least two pieces covers both sides of the circular saw blade.

9. The blade guard as recited in claim 4, wherein the at least two pieces comprises four pieces, wherein two of the pieces are the same but different from the other two of the pieces.

10. The blade guard as recited in claim 4, wherein the at least two pieces comprises six pieces, where there are three pairs of pieces, wherein the first pair of the pieces are the same, the second pair of pieces are the same, and the third pair of pieces are the same, but the first pair, second pair, and third pair are different as compared with one another.

11. The blade guard as recited in claim 4, wherein the top cover includes a recessed portion for forming a handle grip thereon.

12. The blade guard as recited in claim 4, wherein at least a portion of the top cover is integral with the at least two pieces.

13. A wall saw comprising the blade guard as recited in claim 4.

14. A blade guard for a circular saw blade of a saw comprising:
- at least two pieces coupled together, wherein the at least two pieces together form an opening, the opening accommodating passage of the circular saw blade and exposing the portion of the circular saw blade extending beyond the opening;
- at least one bottom plate having a slot formed therein for accommodating the circular saw blade;
- at least one top cover attachable to the saw;
- a plurality of fastening rods for coupling the bottom plate with the top cover, the plurality of fastening rods further configured to secure the at least two pieces to the at least one bottom plate and the at least one top cover; and
- at least one blade cover detachably coupled to the at least two pieces, wherein the at least one blade cover covers the opening and also covering the exposed portion of the circular saw blade in the event the at least one blade cover is coupled to the at least two pieces.

* * * * *